United States Patent [19]

Snyder

[11] 4,231,815

[45] Nov. 4, 1980

[54] COPPER ALLOY BRAZING PASTE

[75] Inventor: John L. Snyder, Cleveland, Ohio

[73] Assignee: SMC Corporation, New York, N.Y.

[21] Appl. No.: 65,374

[22] Filed: Aug. 9, 1979

[51] Int. Cl.$^3$ .............................................. B23K 35/34
[52] U.S. Cl. ........................................ 148/24; 148/25
[58] Field of Search ...................................... 148/23–26

[56] References Cited

U.S. PATENT DOCUMENTS 3,832,242  8/1974  Cuthbert ................................ 148/24
3,986,899  10/1976  Kole ...................................... 148/24

*Primary Examiner*—P. D. Rosenberg
*Attorney, Agent, or Firm*—Thomas M. Schmitz

[57] ABSTRACT

Copper-manganese alloy brazing pastes can be substantially improved by the inclusion of a minor amount of silicon in the alloy. The brazing alloy can contain by weight between about 0.5% and 3% silicon to provide a brazing composition for brazing at temperatures between about 1650° C. and 1850° C.

2 Claims, No Drawings

COPPER ALLOY BRAZING PASTE

BACKGROUND OF THE INVENTION

Furnace brazing generally refers to processes for joining together metal parts which have a melting point appreciably above the filler joining metal. The metal parts are prepositioned onto an assembly which is passed through the brazing furnace wherein preformed brazing material is melted and drawn into a close fitting joint by capillary action to make a strong brazed joint. Copper is the most frequently used filler metal for furnace brazing. More recently, brazing pastes have been developed for brazing metal parts together. Brazing pastes are metal powders most often copper and copper oxide dispersed in a vehicle to provide a paste consistency which can be easily applied to any shaped metallic joint which eliminates the need for a variety of preformed brazing parts. Examples of typical brazing pastes may be found in a series of Klinker patents such as, for example, U.S. Pat. No. 2,566,339; U.S. Pat. No. 2,594,313; and U.S. Pat. No. 2,606,132; and the disclosures of said patents are incorporated herein by reference.

The formation of a properly brazed joint is dependent on a number of factors (AWS Brazing Manual) central to which is the melting temperature of the brazing alloy. This temperature for copper is about 2050° F., while certain alloys of copper are lower. Lower brazing temperatures are desirable since these provide advantages in part fixturing, economy in furnace brazing, and improved life of the furnace and furnace accessories. While the melting temperature of a copper-manganese alloy makes it a candidate for reduced temperature brazing, rapid oxidation of the manganese under normal brazing conditions has prevented its commercial use.

It has now been found that a copper alloy brazing paste composition can be produced from a copper-manganese alloy containing a minor amount of silicon up to about 3% by weight. The inclusion of silicon prevents oxidation of the copper alloys since the silicon appears to migrate to the surface of the alloy particles during water atomization process for producing such particles. The silicon is preferentially oxidized with respect to either the copper or manganese matrix metal whereby an oxide film is orientated toward the particle surface. The oxide film can be effectively and easily removed during brazing as distinguished from copper oxides or manganese oxides distributed throughout the particles. These and other advantages of this invention will become more apparent by referring to the Detailed Description of the Invention.

SUMMARY OF THE INVENTION

A brazing composition comprises a copper-manganese alloy containing minor amounts of alloyed silicon wherein the copper-manganese-silicon alloy particles are dispersed in a fugitive binder. The brazing paste composition is suitable for brazing at temperatures between about 1650° C. and 1850° C. The alloy particles contain less than about 0.1% oxides which are essentially confined to the surface area of the alloy particles.

DETAILED DESCRIPTION OF THE INVENTION

This invention pertains to brazing pastes on atomized copper alloy powders containing non-reducible impurities not more than about 0.1% by weight and having an average particle size of between about 5 to 177 microns. Non-reducible oxides have been found to inhibit copper coalescence and produce considerable residue on the brazed part and non-reducible impurities, if any, are essentially confined to the surface or surface portions of atomized copper alloy rather than distributed through the copper particles. Although copper-manganese alloys perform well for brazing purposes under very dry or vacuum conditions, moderate moisture conditions, however, often cause undesirable high levels of oxide formation throughout the alloy particles. In accordance with this invention, a minor amount of silicon is alloyed together with copper-manganese to provide alloyed particles for brazing pastes. The silicon oxide film appears to inhibit oxidation of the matrix metal alloy. The copper-manganese-silicon alloy of this invention can be advantageously utilized at lower brazing temperatures of about 1700° F. rather than conventional higher temperatures of 2050° F. for copper metal based brazing pastes. In accordance with this invention, molten copper-manganese-silicon alloy can be water atomized to produce alloy-fine powder particles. Thus, even if the Cu-Mn-Si alloy particles of this invention are used in a brazing paste under oxidizing atmosphere the particles still resist oxidation and produce an excellent brazed part. The alloy can contain on a weight basis between about 60% and 75% copper, between 24% and 37% manganese, and between 1% and 3% silicon which can be readily atomized to provide powder particles. The alloy particles are bright in color and the metallic portion oxide-free as distinguished from a water atomized copper-manganese alloy particles which are dull due to excessive oxide formation throughout the particle. The copper alloy contains at least 0.5% by weight silicon and preferably 1% to 3% by weight silicon. The minor amount of silicon in the copper alloy is believed to migrate to the particle surface during atomization and consequently become a preferentially oxidized surface film rather than either the copper or the manganese metal in the alloy and thereby effectively reduces oxidation during atomization.

Atomized Cu-Mn-Si alloy powder can be produced by known methods such as described in U.S. Pat. No. 2,956,304 wherein a plurality of liquid streams are directed from points preferential about the middle stream of molten metal to disintegrate the molten metal stream. A plurality of nozzles of the type shown in FIGS. 10 and 11 in U.S. Pat. No. 2,956,304 can be adjusted to produce a diverging flat liquid stream so that the flat liquid streams intersect the liquid metal streams at an angle of about 50° to 60°, as more particularly set forth in said patent and incorporated herein by reference. The liquid atomized alloy metal particles have a desirable size distribution and tend to assume a preferential spherical shape. The atomized copper-manganese-silicon alloy can contain minor amounts of phosphorous, arsenic, gallium, germanium, silicon, nickel, or aluminum, as well as gold, silver, indium, boron, beryllium, bismuth, cobalt, antimony, chromium, iron, magnesium, titanium, palladium, tin and lead wherein the alloy contains up to about 10% of such alloying metals. The desirable brazing compositions are those employing copper-manganese-silicon alloy for brazing at temperatures between about 1650° F. and 1850° F. and preferably between about 1700° F. and 1800° F. Even though minor amounts of silicon are alloyed, the alloy tends to melt at the theoretical melt temperature of the copper-manganese alloy. Particularly preferred alloys are copper-manganese-silicon alloy powders which are finer than 80 mesh and preferably about 50% minus 325 mesh. Such particular alloy powders for brazing pastes provide quicker melting, better flow into the joint, and compounds better into a paste that can be easily dispensed from a variety of suitable apparatus.

The Cu-Mn-Si alloy powders of this invention can be dispersed in fugitive binders or vehicles for binding the powder metal mixture. Binders provide cohesion of metal powders prior to brazing, impart lubricity to the brazing composition, and hold the brazing composition onto the part to be brazed, and facilitate adhesion of the alloy powder to the metal substrate to be brazed. Suitable fugitive binders maintain adhesion of the metal components of the brazing paste prior to brazing, although the fugitive binder itself burns off during furnace brazing and leaves little or no residue on the brazed assembly. Fugitive binders generally have a low Conradson value (A.S.T.M. Standards D-189-46) below about 1% so that little, if any, carbonaceous material remains as a residue after the brazing process. Fugitive binders decompose at working or brazing temperatures and preferably decompose at a temperature much lower than the brazing temperature. The resinous fugitive binder forms a film prior to working due to partial volatilization of the solvent system resulting in increased cohesion of the brazing metal particles and adhesion to the workpiece to which the brazing paste is applied. Examples of fugitive binders having the foregoing properties include homopolymers and copolymers of lower alkyl esters of acrylic acids and methacrylic acids having 1-8 carbon atoms such as, for example, methylmethacrylate, ethylacrylate, methylacrylate, 2-ethyl hexyl acrylate, or mixtures thereof; polystyrene, polyvinyl chloride, polyvinyl acetate, butadienestyrene latices, and polytetrafluoroethylene; cellulosic polymers such as water-soluble cellulosic materials like sodium carboxymethylcellulose, cellulose acetate, cellulose nitrate, and cellulose acetate butyrate, polyolefins such as polypropylene and polyethylene; epoxy resins and polyesters; and rosins such as tall oil rosin and gum rosin. These binder systems are binders which have low residue and low ash and burn off leaving no carbon to interfere with the flow of alloy filler metal. The avoidance of water or other oxidizing constituents is recommended since these tend to negate the beneficial effects of using the protective silicon alloying component.

Sufficient fugitive binder is used in conjunction with the metal powders to bind sufficiently the metal powder together and provide adhesion of the brazing paste to the metal substrate workpiece prior to brazing. Brazing compositions can contain from 2% to 50% by weight fugitive binder.

Solvents are used in the fugitive binder system for desirably rendering the fugitive binder composition in a form suitable for application. Suitable solvents are relatively non-volatile at about 70° F. so that the vehicle system will not have a tendency to dry out prior to use and thus cause difficulties in dispensing in a pressure-pot apparatus. Solvents should volatilize readily at temperatures of about 300° F. and decompose without producing more than a minor amount of carbonaceous residue, smoke or odor during the brazing operation. Suitable solvents include hydrocarbons such as hexane, heptane, kerosene, pentane, and aromatic solvents such as benzene, napthas toluene having a boiling point of up to 450° F. and ketones such as acetone, methylisobutyl ketone, mthyl ethyl ketone and isobutyl ketone; and glycerine, glycols such as ethylene, propylene and diethylene glycol; esters such as methyl acetate, ethyl acetate, butyl acetate, and monoethyl ether acetate; glycol ethers such as diethylene glycol diethyl ether; alcohols such as ethanol, propanol, methanol, ether alcohols such as 2-epoxy ethanol, 2-ethoxy butanol and ether ketones. Water can be used sparingly as a solvent but is objectionable due to the deleterious oxidizing effects water has on the brazing alloy.

The fugitive binder is proportioned with solvent and other binder constituents and is formulated to achieve desired brazing paste viscosities which, for example, can range from 3,000 centipoises to 150,000 centipoises at 78° F. (using an RVT Brookfield Viscometer, No. 7 spindle, 20 rpm). Brazing compositions having lower viscosities can be used by spray application or brush application whereas brazing compositions having higher viscosities are normally applied with air-pressurized systems that deliver paste to the work via a flow gun or less sophisticated equipment like oilers and plastic bottles. Desirably, the fugitive binder system contains from about 50% to 90% solvent by weight and preferably about 80% solvent to give a 20% binder solid.

Conventional fluxes can be used and include alkali metal fluoroborates, alkali metal carbonates, alkali metal meta-, penta-, and tetraborates, boric acid, alkali metal nitrates, alkali metal chlorides, and hydrohalide salts of hydroxyamines. Although minor amounts of about 0.1%-5% fluxes are included in the brazing composition, flux can be added up to about 30% by weight in the brazing composition. The preferred fluxes contain fluoride and Group I, Period 2 cations thereof appear to be best. Thus, a NaF flux appears more effective than a NaCl flux.

The brazing pastes can be produced by simply adding all of the materials to a mixer and subjecting the ingredients to agitation at room temperature or moderate heat to effect dispersion of the powder metal mixture within the fugitive binder. When a uniform brazing paste composition is achieved, the paste can be removed from the mixer and thereafter screened through a 40-mesh screen or preferably an 80-mesh screen prior to use. The resulting brazing paste is usually kept in a closed container so as to avoid loss of volatile solvents or contamination prior to use.

In preparing an assembly for brazing, the brazing composition can be applied to an assembled metal part and brazed at once or allowed to set prior to brazing. The workpiece coated with brazing paste is then introduced into a brazing furnace wherein the copper or copper alloy metal mixture fuses to become molten metal which flows into the joint. The fugitive binder volatilizes leaving essentially a brazed metal with very little, if any, residue. The heating of the metal workpiece can be effected by a furnace such as a brazing furnace, acetylene-oxygen torch, hot salt bath, electrical means, or other conventional heating techniques useful in brazing.

The metal workpieces adapted for brazing with the brazing paste composition in accordance with this invention are primarily but not limited to, ferrous-containing materials such as, for example, iron, cast iron, steel, stainless steel, mild steel, low and high carbon steel, and also select non-ferrous materials such as nickel and certain nickel-base alloys like cupro-nickel. The optimum brazing temperatures for cold rolled steel and stainless steel in a hydrogen atmosphere were between about 1650° F. and 1850° F. At higher temperatures above about 1900° F. poorer brazed joints resulted indicating overheating. At lower brazing temperatures around 1500° F., acceptable brazed joints were obtained although not all of the alloy particles were melted. Hence, the preferred brazing temperature range was between about 1700° F. and 1800° F. Brazing in a vacuum and also with a hydrogen atmosphere produced good brazed joints. The brazed parts appeared to have silicon migration to the surface due to migration of silicon to the grain boundaries during solidification of the alloy particles in the joint.

The following examples are provided to illustrate preferred embodiments of this invention but are not intended to limit the scope thereof.

EXAMPLE 1

A copper-manganese-silicon alloy comprising by weight essentially 66.65% Cu, 31.38% manganese, and 1.89% with minor trace amounts of carbon. The alloy was water atomized to −100 mesh particle size with the following Tyler Sieve.

| | |
|---|---|
| +80 | trace |
| +100 | 3.1% |
| +150 | 19.4% |
| +200 | 21.0% |
| +325 | 23.1% |
| −325 | 33.4% |

The atomized alloy particles were mixed with a vehicle and flux on a weight basis of 75 parts alloy, 23 parts vehicle, and 2 parts flux. The vehicle comprised 68.5% propasol DM, 29.5% butyl carbitol, and 2.0% Klucel H. Various fluxes as follows were utilized in separate test composition:

| | |
|---|---|
| Barnum fluoride (BaF) | 1760° F. Melting point |
| Lithium fluoride (LiF) | 1544° F. Melting point |
| Sodium fluoride (NaF) | 1814° F. Melting point |
| Sodium chloride (NaCd) | 1472° F. Melting point |

TABLE I

Cold rolled steel was brazed using different fluxes under furnace conditions of preheat of 5 minutes, braze time of 10 minutes at indicated temperature, dew point range −50° F. to −62° F., and brazing atmosphere of hydrogen.

| Flux | 1500° F. | 1600° F. | 1700° F. | 1800° F. | 1900° F. |
|---|---|---|---|---|---|
| NaF | Good* | Good | Good | Good | N.G. |
| BaF$_2$ | N.G. | Good | Good | Good | N.G. |
| LiF | Good* | Good | Good | Good | N.G. |
| NaCl | N.G. | N.G. | N.G. | N.G. | N.G. |
| None | N.G. | N.G. | N.G. | N.G. | N.G. |

*Acceptable braze joint although unmelted alloy metal was apparent.

TABLE II

Similarly, stainless steel was brazed using different fluxes at indicated brazing temperatures under furnace conditions of 5 minutes preheat, brazing time of 10 minutes at indicated temperature, dew point range of −40°° F. to −50° F. and brazing atmosphere of hydrogen.

| Flux | 1600° F. | 1700° F. | 1800° F. |
|---|---|---|---|
| NaF | Good | Good | Good |
| BaF$_2$ | N.G. | Good | Good |
| LiF | Good | Good | Good |
| NaCl | N.G. | N.G. | Good* |
| None | N.G. | N.G. | Good* |

*Acceptable although unmelted alloy metal apparent.

TABLE III

In a similar manner, stainless steel test parts were brazed in a vacuum at different temperatures as indicated. The furnace conditions were 0.03 torr for a brazing time of 10 minutes at heating rate of 500° F. per 30 minutes and a cooling rate of 200° F. per 60 minutes. At brazing temperatures between 1700° F. and 1800° F., the brazed joint produced was acceptable although the joints contained unmelted metal. The fluxes used were NaF, BaF$_2$, LiF, and NaCl. In a similar series of tests at a constant brazing temperature of 1800° F., similar results were obtained even though the brazing time was increased to 15 minutes.

The foregoing examples are intended to illustrate the merits of this invention but are not intended to be limiting except as defined by the appended claims.

I claim:

1. A copper-manganese brazing paste composition for brazing at temperatures between about 1650° C. and 1850° C., comprising:
   the alloy powder having an average particle size between 5 and 177 microns and dispersed in fugitive binder to provide a brazing paste containing by weight between 2% and 50% said fugitive binder, said alloy powder being an alloy consisting essentially of on a weight basis 60% to 75% copper, 24% to 37% manganese, and 0.5% to 3% silicon.

2. The composition in claim 1 wherein the alloy contains between 1% and 3% alloyed silicon.

* * * * *